(12) United States Patent
Matsui et al.

(10) Patent No.: US 8,764,530 B2
(45) Date of Patent: Jul. 1, 2014

(54) VIDEO GAME PROCESSING APPARATUS AND VIDEO GAME PROCESSING PROGRAM

(75) Inventors: Yusuke Matsui, Tokyo (JP); Satoru Koyama, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 106 days.

(21) Appl. No.: 13/603,950

(22) Filed: Sep. 5, 2012

(65) Prior Publication Data

US 2013/0065654 A1    Mar. 14, 2013

(30) Foreign Application Priority Data

Sep. 14, 2011  (JP) ................................ P2011-201235

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |

(52) U.S. Cl.
USPC ............ 463/1; 463/7; 463/8; 463/20; 463/37; 463/42

(58) Field of Classification Search
USPC ......................................... 463/1, 7, 8, 20, 37
See application file for complete search history.

(56) References Cited

U.S. PATENT DOCUMENTS

| | | | |
|---|---|---|---|
| 4,657,247 | A | 4/1987 | Okada |
| 6,203,426 | B1 | 3/2001 | Matsui et al. |
| 8,012,007 | B2 | 9/2011 | Yoshida |
| 8,251,789 | B2 | 8/2012 | Ikejiri et al. |
| 8,317,580 | B2 | 11/2012 | Kikuchi |
| 2003/0040364 | A1 | 2/2003 | Yabe et al. |
| 2008/0254879 | A1 | 10/2008 | Motoyama |
| 2009/0215511 | A1 | 8/2009 | Ikejiri et al. |
| 2010/0137050 | A1 | 6/2010 | Yoshida |
| 2011/0276879 | A1 | 11/2011 | Ando et al. |

FOREIGN PATENT DOCUMENTS

| | | |
|---|---|---|
| EP | 0919266 | 6/1999 |
| JP | 2003-062345 | 3/2003 |
| JP | 2007-260195 | 10/2007 |
| JP | 2008-161602 | 7/2008 |
| JP | 2009-050739 | 3/2009 |
| JP | 2010-131075 | 6/2010 |
| JP | 2012-020060 | 2/2012 |

OTHER PUBLICATIONS

Extended European Search Report from European Patent Office (EPO) in European Patent Application No. 12183379.2, dated Jan. 30, 2013.
Office Action from Japan Patent Office (JPO) in Japanese Patent Application No. 2011-201235, dated Sep. 10, 2013, along with an English language translation thereof.

*Primary Examiner* — Adetokunbo O Torimiro
(74) *Attorney, Agent, or Firm* — Greenblum & Bernstein, P.L.C.

(57) ABSTRACT

A video game processing apparatus for controlling progress of a video game is provided. It is determined whether a predetermined command is effectively received for a predetermined number of times or more or not when a predetermined period of time is measured from a time when a time measuring start condition is satisfied. A specific process corresponding to the fact that the predetermined command is effectively received for the predetermined number of times is carried out in a case where the predetermined command is effectively received for the predetermined number of times. In this case, it is confirmed whether an effective reception number reaches the effective reception upper limit number or more when the predetermined command is received, and it is determined that the predetermined command is effectively received in a case where the effective reception number does not reach the effective reception upper limit number.

6 Claims, 10 Drawing Sheets

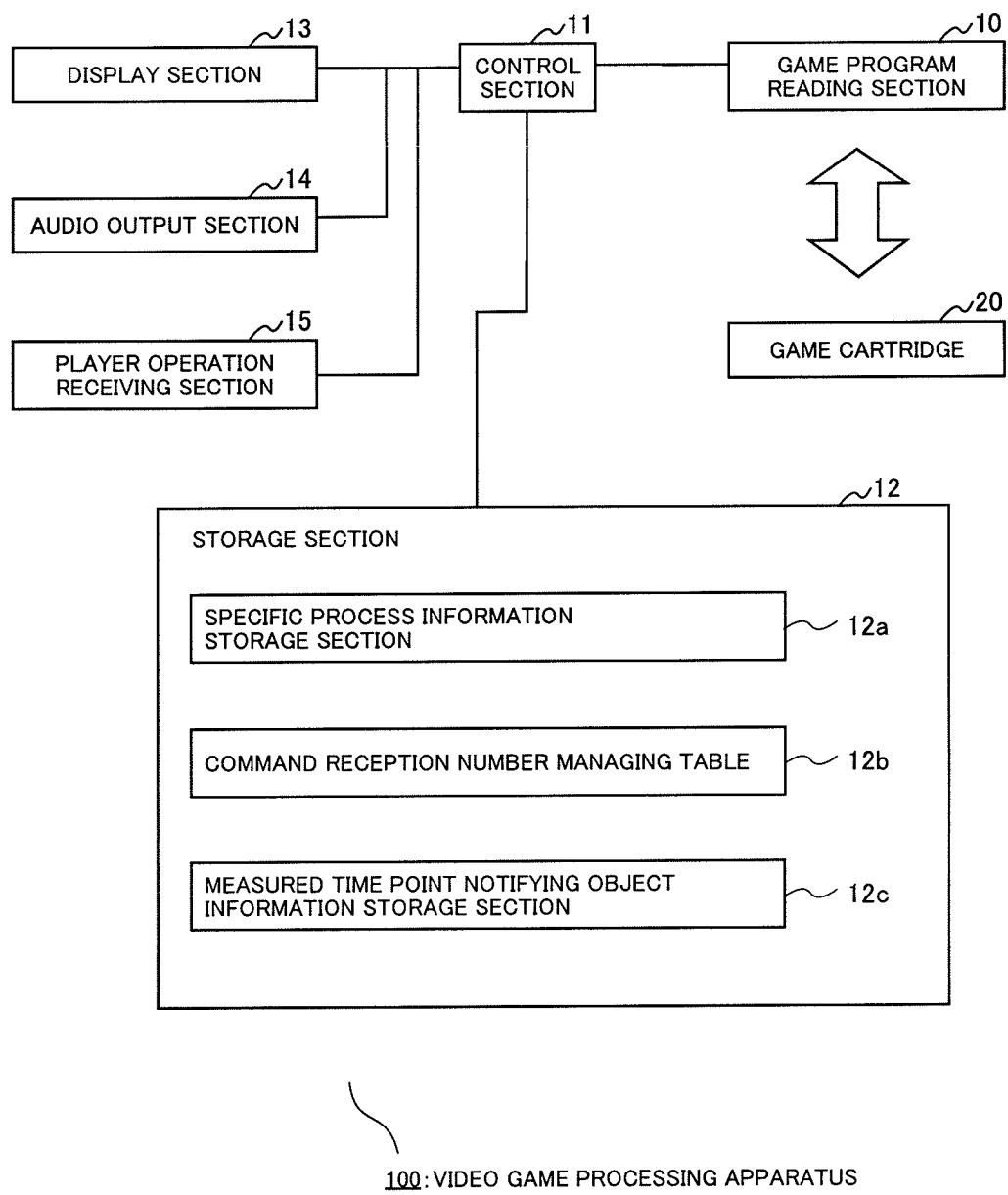

Fig. 2

SPECIFIC PROCESS INFORMATION

| NAME OF SPECIFIC PROCESS | TIME MEASURING START CONDITION | CORRESPONDING COMMAND | NECESSARY INPUT NUMBER OF TIMES | TIME LIMIT | RESTRICTION CANCELING TIME | RESTRICTION CANCELING RULE | PROCESS CONTENT |
|---|---|---|---|---|---|---|---|
| SPECIAL ATTACK | START OF HOT COMPETITION AGAINST ENEMY CHARACTER | PRESS OF X BUTTON | 20 TIMES | EIGHT SECONDS | FIVE SECONDS | EFFECTIVE RECEPTION UPPER LIMIT NUMBER (MAXIMUM PROGRESS RATE) IS INCREASED BY FOUR TIMES PER ONE SECOND (20%), AND RESTRICTION OF EFFECTIVE RECEPTION NUMBER (PROGRESS RATE) IS CANCELLED WHEN MEASURED TIME REACHES RESTRICTION CANCELING TIME. | ... |
| ... | | | | | | | ... |

Fig. 3

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 | 4 TO 5 | 5 TO 8 |
|---|---|---|---|---|---|---|
| COMMAND RECEPTION NUMBER | – | – | – | – | – | – |
| EFFECTIVE RECEPTION NUMBER | – | – | – | – | – | – |
| EFFECTIVE RECEPTION UPPER LIMIT NUMBER (MAXIMUM PROGRESS RATE [%]) | – (–) | | | | | |

Fig. 4A

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 | 4 TO 5 | 5 TO 8 |
|---|---|---|---|---|---|---|
| COMMAND RECEPTION NUMBER | 4 | 3 | 5 | 3 | 5 | – |
| EFFECTIVE RECEPTION NUMBER | 0 | 3 | 8 | 11 | 16 | – |
| EFFECTIVE RECEPTION UPPER LIMIT NUMBER (MAXIMUM PROGRESS RATE [%]) | 16 (80) | | | | | |

Fig. 4B

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 | 4 TO 5 | 5 TO 8 |
|---|---|---|---|---|---|---|
| COMMAND RECEPTION NUMBER | 4 | 3 | 5 | 3 | 5 | 4 |
| EFFECTIVE RECEPTION NUMBER | 0 | 3 | 8 | 11 | 16 | 20 |
| EFFECTIVE RECEPTION UPPER LIMIT NUMBER (MAXIMUM PROGRESS RATE [%]) | 20 (100) | | | | | |

Fig. 11

SPECIFIC PROCESS INFORMATION

| NAME OF SPECIFIC PROCESS | TIME MEASURING START CONDITION | CORRESPONDING COMMAND | NECESSARY INPUT NUMBER OF TIMES | INPUT TIME | DIVIDED NUMBER | PROCESS CONTENT | ... |
|---|---|---|---|---|---|---|---|
| SPECIAL ATTACK | START OF HOT COMPETITION AGAINST ENEMY CHARACTER | PRESS OF X BUTTON | EIGHT TIMES | FOUR SECONDS | 4 | ... | ... |

Fig. 12

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 |
|---|---|---|---|---|
| NUMBER OF TIMES OF DIVISION | 2 | 2 | 2 | 2 |
| COMMAND RECEPTION NUMBER | – | – | – | – |
| DETERMINATION RESULT | – | – | – | – |

Fig. 13A

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 |
|---|---|---|---|---|
| NUMBER OF TIMES OF DIVISION | 2 | 2 | 2 | 2 |
| COMMAND RECEPTION NUMBER | 2 | 3 | 3 | 3 |
| DETERMINATION RESULT | 1 | 1 | 1 | 1 |

Fig. 13B

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 |
|---|---|---|---|---|
| NUMBER OF TIMES OF DIVISION | 2 | 2 | 2 | 2 |
| COMMAND RECEPTION NUMBER | 2 | 3 | 1 | 3 |
| DETERMINATION RESULT | 1 | 1 | 0 | 1 |

Fig. 13C

COMMAND RECEPTION NUMBER MANAGING TABLE

| ELAPSED TIME (DIVIDED TIME) [SEC.] | 0 TO 1 | 1 TO 2 | 2 TO 3 | 3 TO 4 |
|---|---|---|---|---|
| NUMBER OF TIMES OF DIVISION | 2 | 2 | 2 | 2 |
| COMMAND RECEPTION NUMBER | 2 | 3 | 1 | – |
| DETERMINATION RESULT | 1 | 1 | 0 | – |

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2011-201235, filed on Sep. 14, 2011, the disclosure of which is expressly incorporated herein by reference in its entirety.

BACKGROUND OF THE INVENTION

1. Field of the Invention

The present invention relates to technique for controlling progress of a video game.

2. Description of the Related Art

Heretofore, various kinds of video games including a video game called an RPG (role-playing game: a game in which a player plays a role of a character in a world of the video game, and accomplishes a predetermined object while enjoying a process that the character grows through various experiences) and a simulation game have been provided.

In video game processing apparatuses for carrying out such a video game, there is one in which a specific effect is generated in a case where a predetermined operational input is received within a predetermined period of time (for example, Japanese Patent Application Publication No. 2008-161602).

In the conventional video game processing apparatuses as described above, for example, there is one in which a player is requested to carryout the plural number of times of command inputs within a predetermined period of time indicated by a gauge in a battle scene and the like. In the gauge, a display point is increased in accordance with elapse of time.

In such a case, a player familiar with an input operation of a command can readily operate the input operation, but it is difficult for a player unfamiliar with an input operation of a command to operate the input operation and it thus becomes difficult to complete a requested command input within a predetermined period of time. For this reason, it contributes to a feeling of a difference of skills of the player unfamiliar with an input operation of a command against the player unfamiliar with an input operation of a command, and it thus causes interest in a video game to be lowered. Because of such a situation, it is requested that even the player unfamiliar with an input operation of a command carries out an input request of a command, by which the video game is caused to proceed, without feeling the difference of skills against the player familiar with an input operation of a command.

On the other hand, in a case where a simple command input is to be required, there is a fear that it causes interest of a player, who is familiar with an input operation of a command, in a video game to be lowered.

Namely, it is desired to provide a video game processing apparatus that carries out an input request of a command and determination of input completion so that a player unfamiliar with an input operation of a command can readily complete an input operation while maintaining difficulty of an input operation by a player familiar with an input operation of a command.

SUMMARY OF THE INVENTION

The present invention has been made in order to solve the problems described above, and it is an object of the present invention to provide a video game processing apparatus by which it is possible to improve interest of a player in the video game by allowing the player to carry out an input request of a command and determination of input completion so that the player can carry out an input operation readily while maintaining difficulty of an input operation of a command by the player.

In order to achieve the above object, the present invention is directed to a video game processing apparatus for controlling progress of a video game by causing a display device to display a game screen on a display screen of the display device. The video game processing apparatus according to the present invention includes a command receiver for receiving a command inputted by means of an operation of the player.

The video game processing apparatus also includes a timer for measuring a predetermined period of time defined in advance from a time when a time measuring start condition is satisfied in the video game.

The video game processing apparatus also includes an object display controller for causing the display device to display a measured time point notifying object on the display screen, the measured time point notifying object indicating a measured time point corresponding to a measured time measured by the timer.

The video game processing apparatus also includes a command reception number determiner for determining whether the command receiver effectively receives a predetermined command for a predetermined number of times or more or not when the timer measures the predetermined period of time The video game processing apparatus also includes an effective reception upper limit number updater for updating an effective reception upper limit number by increasing the effective reception upper limit number from an initial number of times to the predetermined number of times in a stepwise manner in accordance with elapse of the measured time measured by the timer.

The video game processing apparatus also includes a specific process executor for carrying out a specific process in a case where the command reception number determiner determines that the predetermined commands is effectively received for the predetermined number of times, the specific process corresponding to the fact that the predetermined command is effectively received for the predetermined number of times.

In this case, the command reception number determiner confirms whether an effective reception number, which indicates the number of times the predetermined command is effectively received, reaches the effective reception upper limit number or more when the command receiver receives the predetermined command, and determines that the predetermined command is effectively received by the command receiver in a case where the effective reception number does not reach the effective reception upper limit number.

By configuring it as described above, it becomes possible to improve interest of a player in the video game by allowing the player to carry out an input request of a command and determination of input completion so that the player can carry out an input operation readily while maintaining difficulty of an input operation of a command by the player.

In the video game processing apparatus according to the present invention, it is preferable that the effective reception upper limit number updater sets up the effective reception upper limit number to the predetermined number of times when the measured time measured by the timer reaches a specific time before the predetermined period of time.

In the video game processing apparatus according to the present invention, it is preferable that the effective reception upper limit number updater increases the effective reception upper limit number every given time until the measured time measured by the timer reaches the specific time.

In the video game processing apparatus according to the present invention, it is preferable that the measured time point notifying object has a region according to each divided time, and is a circular gauge indicating a remaining amount of the predetermined period of time.

In the video game processing apparatus according to the present invention, it is preferable that the command receiver receives a command from each of a plurality of players, wherein the specific process executor has a player identifier for identifying at least one player, and the command reception determiner determines that the predetermined command is effectively received for the predetermined number of times or more from the at leas one player more rapidly than the other players of the plurality of players, and wherein the specific process executor carries out the specific process against a character operated by the player identified by the player identifier.

Moreover, in another aspect of the present invention, the present invention is directed to a video game processing program for causing a video game processing apparatus to control an operation of the video game processing apparatus. In this case, the video game processing apparatus controls progress of a video game by displaying a game screen on a display screen of a display device. The video game processing program product according to the present invention causes the video game processing apparatus to execute steps including receiving a command inputted by means of an operation of the player.

The steps also include measuring a predetermined period of time defined in advance from a time when a time measuring start condition is satisfied in the video game.

The steps also include causing the display device to display a measured time point notifying object on the display screen, the measured time point notifying object indicating a measured time point corresponding to a measured time measured in the measuring a predetermined period of time.

The steps also include determining whether a predetermined command is effectively received for a predetermined number of times or more in the receiving a command or not when the predetermined period of time is measured in the measuring a predetermined period of time.

The steps also include updating an effective reception upper limit number by increasing the effective reception upper limit number from an initial number of times to the predetermined number of times in a stepwise manner in accordance with elapse of the measured time measured in the measuring a predetermined period of time.

The steps also include carrying out a specific process in a case where it is determined, in the determining whether a predetermined command is effectively received, that the predetermined command is effectively received for the predetermined number of times, the specific process corresponding to the fact that the predetermined command is effectively received for the predetermined number of times.

In the determining whether a predetermined command is effectively received, it is confirmed whether an effective reception number, which indicates the number of times the predetermined command is effectively received, reaches the effective reception upper limit number or more when the predetermined command is received in the receiving a command, and it is determined that the predetermined command is effectively received in the receiving a command in a case where the effective reception number does not reach the effective reception upper limit number.

According to the present invention, it becomes possible to improve interest of a player in the video game by allowing the player to carry out an input request of a command and determination of input completion so that the player can carry out an input operation readily while maintaining difficulty of an input operation of a command by the player.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 1 is a block diagram showing an example of a configuration example of a video game processing apparatus;

FIG. 2 is an explanatory drawing showing an example of a storage state of specific process information;

FIG. 3 is an explanatory drawing showing an example of a storage state of command reception number information;

FIG. 4 is an explanatory drawing for explaining a state of a command reception number managing table in accordance with progress of a video game;

FIG. 11 is an explanatory drawing showing an example of a storage state of specific process information according to the second embodiment;

FIG. 12 is an explanatory drawing showing an example of a storage state of command reception number information according to the second embodiment;

FIG. 13 is an explanatory drawing for explaining a state of command reception number managing table in accordance with progress of a video game according to the second embodiment.

DETAILED DESCRIPTION OF THE INVENTION

<First Embodiment>

Figure 5A:
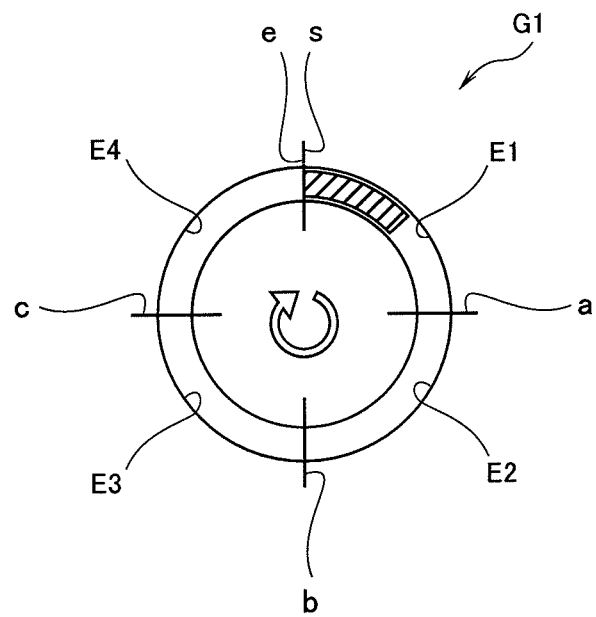
FIG. 5 is an explanatory drawing for explaining an example of a timer object.

Hereinafter, a first embodiment according to the present invention will be described with reference to the appending drawings.

FIG. 1 is a block diagram showing an example of a configuration example of a video game processing apparatus 100 according to a first embodiment of the present invention. As shown in FIG. 1, the video game processing apparatus 100 includes: a game program reading section 10; a control section 11; a storage section 12; a display section 13; an audio output section 14; and a player operation receiving section 15.

The game program reading section 10 detachably receives a game cartridge 20 into which a storage medium is embedded. A video game program is stored in the storage medium. The game program reading section 10 reads out a necessary video game program from the storage medium of the inserted game cartridge 20. In this regard, in the present embodiment, a video game program classified into an RPG is stored in the storage medium embedded into the game cartridge 20. However, a category to which the video game program stored in the storage medium embedded in the game cartridge 20 belongs is not limited to an RPG. So long as a video game is one in which the player is requested to input a predetermined command within a predetermined period of time, the present invention can be applied to various kinds of categories.

The control section 11 has a function to carry out a video game program read out by the game program reading section 10 and stored in the storage section 12, and a function to carry out various kinds of controls for causing the video game to proceed in accordance with an operation of a player.

In particular, the control section 11 carries out necessary controls for causing the video game processing apparatus 100 to carry out: command receiving processing to receive a command inputted by means of an operation of the player; time measuring processing to measure a predetermined period of time defined in advance from a time when a time measuring start condition is satisfied in the video game; object displaying processing to cause the display section 13 to display a measured time point notifying object on a display screen, the measured time point notifying object indicating a measured time point corresponding to a measured time measured in the time measuring processing; command reception number determining processing to determine whether a predetermined command is effectively received for a predetermined number of times or not in the command receiving processing when the predetermined period of time is measured in the time measuring processing; effective reception upper limit number updating processing to update an effective reception upper limit number by increasing the effective reception upper limit number from an initial number of times to a predetermined number of times in a stepwise manner in accordance with elapse of the measured time measured in the time measuring processing; specific process executing processing to carry out a specific process in a case where it is determined in the command reception number determining processing that the predetermined commands are effectively received for the predetermined number of times, the specific process corresponding to the fact that the predetermined command is effectively received for a predetermined number of times; in the command reception number determining processing, it is confirmed whether the effective reception number, which indicates the number of times the predetermined command is effectively received, reaches the effective reception upper limit number when the predetermined command is received in the command receiving processing; and it is determined that the predetermined command is effectively received in the command receiving processing in a case where the effective reception number does not reach the effective reception upper limit number. In this regard, main processing regarding the present invention will be described later in detail.

The storage section 12 is a storage medium for storing a video game program necessary when to cause a video game to proceed and various kinds of data. The storage section 12 is configured by a nonvolatile memory such as a RAM, for example. Various kinds of information registered and/or updated in accordance with progress of the video game and various kinds of information read out from the storage medium embedded in the game cartridge 20 to be used in the video game are stored in the storage section 12.

In the present embodiment, the storage section 12 includes a specific process information storage section 12a, a command reception number managing table 12b, and a measured time point notifying object information storage section 12c.

The specific process information storage section 12a is a storage medium for storing specific process information. The specific process information is information on a specific process (hereinafter, referred to as a "specific process") carried out by the control section 11 in a case where an input of a predetermined command is received for the predetermined number of times via the player operation receiving section 15 in accordance with a progress status of the video game and the like.

FIG. 2 is an explanatory drawing showing an example of a storage state of the specific process information stored in the specific process information storage section 12a. As shown in FIG. 2, the specific process information contains: a name of a specific process; a time measuring start condition; a corresponding command; a necessary input number of times; a time limit; a restriction canceling time; a restriction canceling rule; and process content. In this regard, in the present embodiment, the case where only one specific process carried out when an input of the predetermined command is received for the predetermined number of times within a predetermined period of time is stored will be described. However, the video game processing apparatus 100 may be configured so that information on plural kinds of specific processes is contained in the specific process information storage section 12a.

Here, the "time measuring start condition" means a condition that measurement of time for receiving a predetermined command corresponding to the specific process is start. In the present embodiment, the case where "start of hot competition (so-called Tsubazeriai) against an enemy character" is set up will be described as an example. In this regard, the content of the time measuring start condition is not particularly limited. For example, the time measuring may be configured to start when a predetermined operational input by the player is received.

Further, the "corresponding command" means the content of the command that the player is requested as an execution request of the specific process. In the present embodiment, the case where "press of an X button" is set up as the corresponding command corresponding to the specific process name "special attack" will be described as an example. In this regard, the corresponding command is not limited to press of a button that constitutes a controller. For example, the corresponding command may be combination of a plurality of commands or the like.

Further, the "necessary input number of times" means the input number of times of the corresponding command that the player is requested as the execution request of the specific process. Further, the "time limit" means a time when the corresponding command inputted by means of an operation of the player is received. In the present embodiment, the case where the player is requested to input the corresponding command "press of the X button" for "20 times" within "eight seconds" after the time measuring start condition is satisfied will be described as an example.

Further, the "restriction canceling time" means time when restriction of an effective reception number (or the maximum progress rate) is cancelled. The effective reception number indicates the number of times a command inputted by the player is effectively received. Namely, in the present embodiment, the control section 11 updates the effective reception upper limit number by increasing the effective reception upper limit number from the initial number of times to the predetermined number of times in a stepwise manner in accordance with elapse of the measured time measured by means of a timer function that the video game processing apparatus 100 has, for example. Then, when the measured time reaches the restriction canceling time, the effective reception upper limit number is set up to the same as the necessary input number of times (or more). In the present embodiment, the case where the restriction canceling time is set to "five minutes" will be described as an example.

Further, the "restriction canceling rule" means a rule for canceling restriction of the effective reception number. In the present embodiment, the case where a rule "an effective reception upper limit number (the maximum progress rate) is increased by four times per one second (20%) and restriction of an effective reception number (progress rate) is cancelled when a measured time reaches a restriction canceling time" is set up as the restriction canceling rule will be described as an example. In this regard, the restriction canceling rule may be one in which the effective reception upper limit number becomes the necessary input number of times or more within the time limit, and the other things are not limited particularly.

The command reception number managing table 12b is a storage medium for storing command reception number information on the number of times the command inputted by an operation of the player is received.

FIG. 3 is an explanatory drawing showing an example of a storage state of the command reception number information stored in the command reception number managing table 12b. As shown in FIG. 3, the command reception number information contains: an elapsed time (divided time) since the measurement of time is started in accordance with satisfaction of the time measuring condition; the number of times the control section 11 receives the corresponding command every divided time (that is, the number of times an input of the command is actually received, hereinafter, referred to as "command reception number"); the number of times the command is effectively received in accordance with the effective reception upper limit number (effective reception number); and the effective reception upper limit number (or the maximum progress rate).

FIGS. 4A and 4B are explanatory drawings for explaining a state of the command reception number managing table 12b in accordance with progress of the video game. As shown in FIGS. 4A and 4B, in the command reception number managing table 12b, the number of times the corresponding command inputted by means of an operation of the player is received is registered in a cell corresponding to the command reception number and the divided time. Further, the "effective reception number according to the measured time" determined in accordance with the specific process information is registered into the cell corresponding to the effective reception number and the divided time. Namely, for example, in the case of the specific process information according to the present embodiment (see FIG. 2), when the measured time (measured time) is "four seconds or more and less than five seconds", the control section 11 registers "16" into the command reception number managing table 12b as the effective reception upper limit number, and updates the command reception number and the effective reception number in accordance with the number of times the command inputted by the player is received. In this regard, even though any command is further received in a state shown in FIG. 4A, the effective reception number has already reached "16", which is the effective reception upper limit number. Therefore, the control section 11 does not update the effective reception number. Then, when the measured time reaches "five seconds or more", the control section 11 registers "20" in the command reception number managing table 12b as the effective reception upper limit number, and updates the command reception number and the effective reception number in accordance with the number of times the command inputted by the player is received. As a result, when the effective reception number reaches the necessary input number of times (20 times, see FIG. 2), the control section 11 carries out the process content corresponding to the name of the specific process "special attack".

The measured time point notifying object information storage section 12c is a storage medium for storing information on the measured time point notifying object that indicates a measured time point corresponding to a time measured after satisfaction of the time measuring condition. In the present embodiment, by using the measured time point notifying object (hereinafter, referred to arbitrarily as a "timer object"), it is possible to notify the player of input timing of the specific process.

Figure 5B:
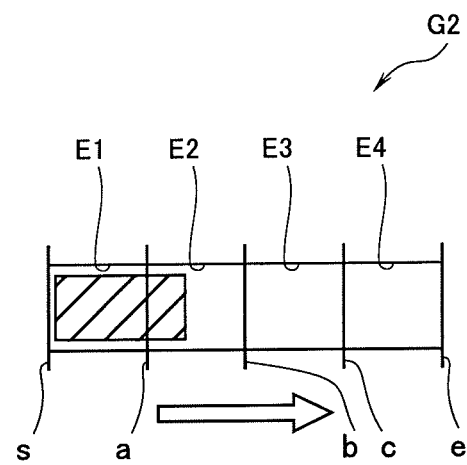

FIG. 5 is an explanatory drawing for explaining an example of the timer object. The timer object may be a circular gauge G1 as shown in FIG. 5A or a linear gauge G2 as shown in FIG. 5B, for example, so long as the measured time can be identified. In this regard, in each of the gauge G1 and the gauge G2, divided times of the specific process are respectively a region (area E1) between a line segment s and a line segment a, a region (area E2) between a line segment a and a line segment c, a region (area E3) between a line segment c and a line segment d and a region (area E4) between a line segment d and a line segment e. In this regard, in the gauge G1 and the gauge G2, the gauge is fulfilled depending upon an amount of consumption of the time limit (that is, the measured time with respect to the input time), and the gauge is finally fulfilled when the time limit becomes zero. Conversely, the gauges G1 and G2 maybe designed so that the gauge decreases depending upon the amount of consumption of the time limit. Therefore, the gauge itself becomes a measured time point corresponding to the measured time.

In this regard, the configuration of the timer object is not limited to the form (or shape) shown in FIG. 5 (gauges G1, G2), and may be a figure, a circular graph, animation or the like, for example. Further, in a case where there are a plurality of specific processes, the video game processing apparatus 100 maybe configured so that a different timer object is to be used in accordance with a specific process for carrying out input determination of a command.

Further, the timer object is not necessarily displayed on the game screen so that the timer object is divided into the plurality of areas E1 to E4 according to the divided time, and it may be available for internal processing in the video game processing apparatus 100.

The display section 13 is a display device for displaying the game screen according to progress of the video game and an operation of the player in accordance with a control of the control section 11. The display section 13 is constructed by a liquid crystal display, for example.

The audio output section 14 outputs audio in response to progress of the video game and an operation of the player in accordance with a control of the control section 11.

The player operation receiving section 15 receives an operational signal according to an operation of the player from a controller constructed by a plurality of buttons, a mouse and the like, and notifies that result to the control section 11.

Next, an operation of the video game processing apparatus 100 according to the present embodiment will be described.

Figure 6:
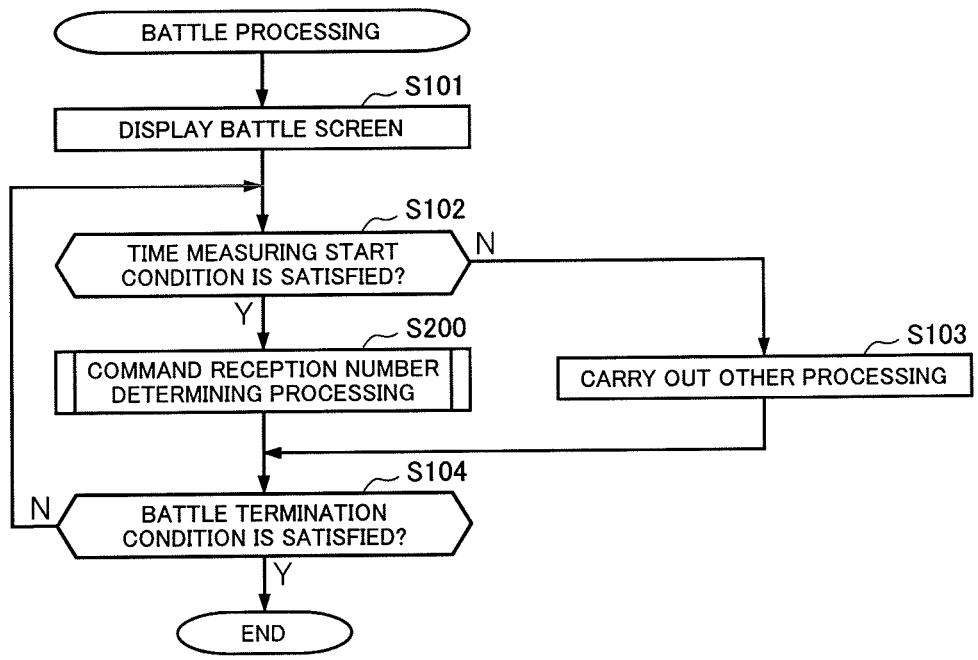
FIG. 6 is a flowchart showing an example of battle processing.

FIG. 6 is a flowchart showing an example of battle processing carried out by the video game processing apparatus 100. In the battle processing, processes to carry out a battle between a player character and an enemy character, including input determination of a command using the command reception number managing table 12b, are carried out. In this regard, the content of processing with no relationship to the present invention may be omitted.

The battle processing is started when a battle between the player character and an enemy character is started in accordance with progress of the video game, for example. Hereinafter, the case where a battle between a player character PC and an enemy character NPC is carried out will be described. The player character PC is operated by a player A who is a user of the video game processing apparatus 100. The enemy character NPC is controlled by the control section 11.

When the battle processing is started, the control section 11 causes the display section 13 to display a battle screen on a display screen of the display section 13 (Step S101).

Figure 7:
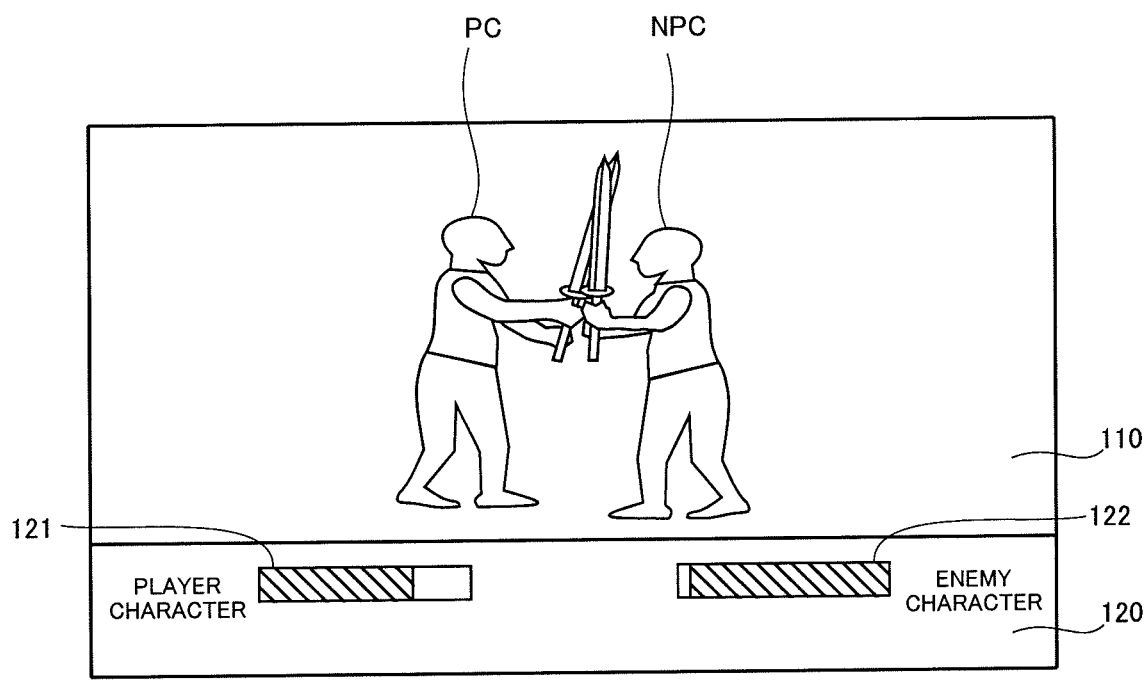
FIG. 7 is an explanatory drawing showing an example of a battle screen.

FIG. 7 is an explanatory drawing showing an example of the battle screen. As shown in FIG. 7, a battle scene display region 110 and a status display region 120 are provided on the battle screen. A battle scene between the player character PC and the enemy character NPC is drawn in the battle scene display region 110. A status (in the present embodiment, HP) gauge 121 for the player character PC and a status gauge 122 for the enemy character NPC are displayed in the status display region 120.

When the battle screen is displayed, the control section 11 determines whether a time measuring start condition is satisfied or not in accordance with progress of the battle (or battle status) (Step S102). The time measuring start condition indicates specific process information. Here, in a case where it is determined that the time measuring start condition is not satisfied ("No" at Step S102), the control section 11 carries out other processing including a control of the enemy character NPC and the like (Step S103), and causes the processing flow to shift to a process at Step S104 (will be described later).

On the other hand, when hot competition between the player character PC and the enemy character NPC is started as shown in FIG. 7, for example, the control section 11 determines that the time measuring start condition is satisfied ("Yes" at Step S102), and carries out command reception number determining processing (will be described later) (Step S200).

In the present embodiment, the control section 11 determines, as the command reception number determining processing, whether a predetermined command is received for the predetermined number of times or more within a predetermined period of time or not, and carries out a process according to a determination result. Hereinafter, the case where the control section 11 carries out the command reception number determining processing using the specific process information shown in FIG. 2 will be described as an example.

Figure 8:
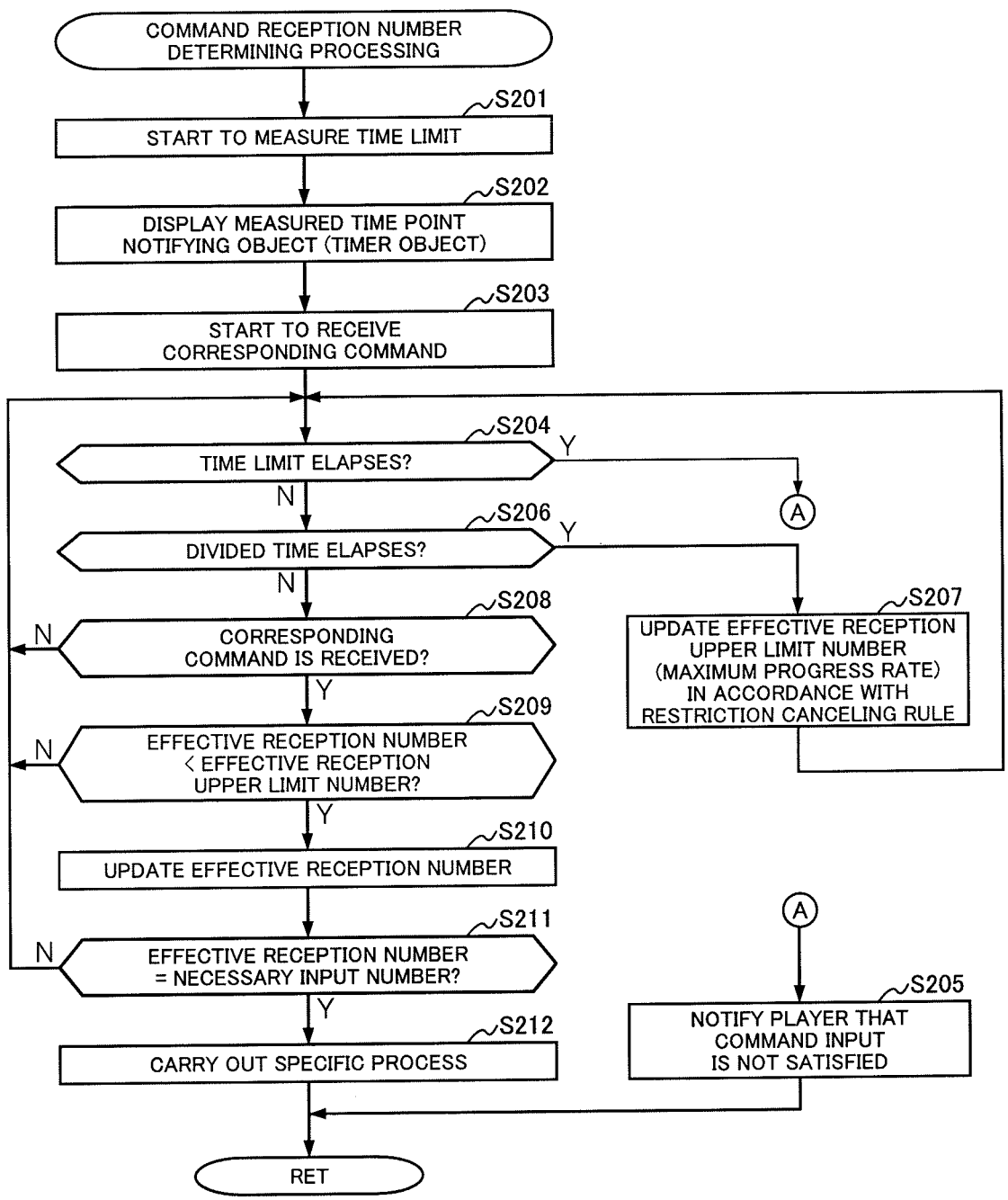
FIG. 8 is a flowchart showing an example of command reception number determining processing.

FIG. 8 is a flowchart showing an example of the command reception number determining processing carried out by the video game processing apparatus 100. In the command reception number determining processing, the control section 11 first starts to measure a time limit (a time limit stored in the specific process information, for example, eight seconds) (Step S201).

When measurement of the time limit is started, the control section 11 causes the display section 13 to display the measured time point notifying object (timer object) on the display screen of the display section 13 (Step S202). At this time, the control section 11 causes the display section 13 to display a timer object, whose gauge is fulfilled when the predetermined period of time (in the present embodiment, the time to be measured, that is, eight seconds that is the time limit) elapses, on the display screen.

Figure 9:
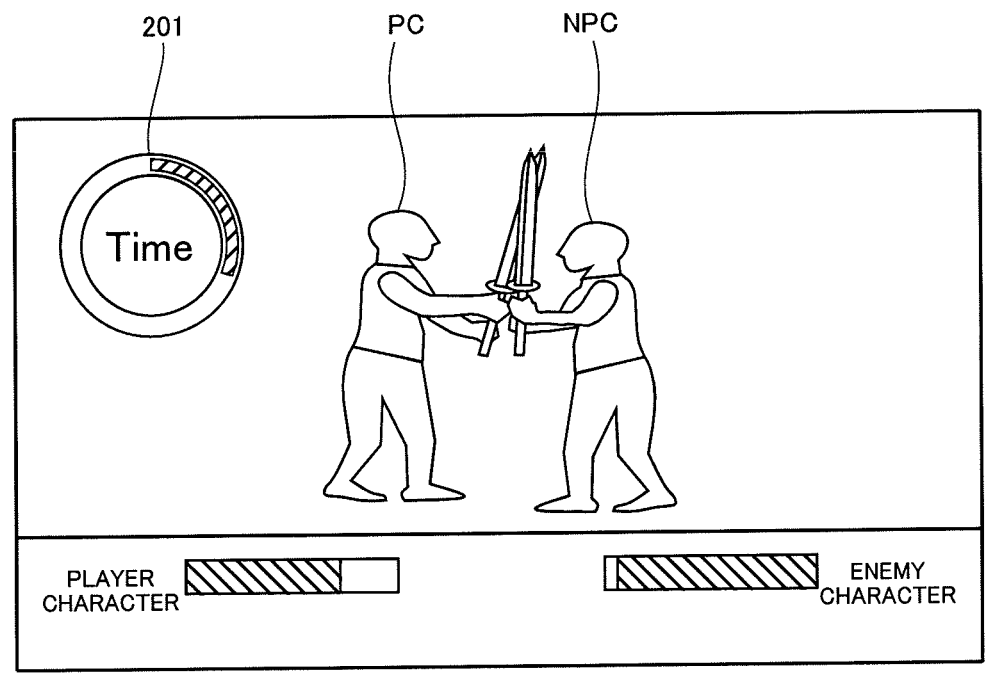
FIG. 9 is an explanatory drawing showing an example of the battle screen on which the timer object is displayed.

FIG. 9 is an explanatory drawing showing an example of the battle screen on which the timer object is displayed. As shown in FIG. 9, a timer object 201 is displayed at a predetermined position on the battle screen. By displaying the timer object 201 and changing a display form of the timer object 201 in accordance with measured time (that is, increasing a gauge in accordance with the measured time), it is possible to notify the player A that it is input timing of the command corresponding to the specific process and of its input time.

When the timer object 201 is displayed, the control section 11 starts to receive a predetermined command (that is, a corresponding command indicated by the specific process information, press of the X button) (Step S203).

When the reception of the predetermined command is started, the control section 11 determines whether the time limit elapses or not (Step S204). Here, in a case where it is determined that the time limit elapses ("Yes" at Step S204), the control section 11 carries out a process to eliminate the timer object 201 from the battle screen; a process to terminate the reception of the corresponding command; and a process to notify the player A that the command input is unsatisfied, such as a process to output audio for notifying that effect (Step S205).

On the other hand, in a case where it is determined that the predetermined period of time does not elapse ("No" at Step S204), the control section 11 determines whether the divided time elapses or not (Step S206). Here, in a case where it is determined that the divided time has elapsed ("Yes" at Step S206), the control section 11 updates the effective reception upper limit number in accordance with a restriction canceling rule indicated by the specific process information (Step S207), and causes the processing flow to shift to the process at Step S204.

On the other hand, in a case where it is determined that the divided time has not elapse yet ("No" at Step S206), the control section 11 determines whether a corresponding command is received or not (Step S208). Here, in a case where it is determined that the corresponding command is not received ("No" at Step S208), the control section 11 causes the processing flow to shift to the process at Step S204.

On the other hand, in a case where it is determined that the corresponding command is received ("Yes" at Step S208), the control section 11 refers to the command reception number managing table 12b, and determines whether the effective reception number reaches the effective reception upper limit number or not (Step S209). Here, in a case where it is determined that the effective reception number is the effective reception upper limit number or more ("No" at Step S209), the control section 11 does not update the effective reception number, but updates only the command reception number, and causes the processing flow to shift to the process at Step S204.

On the other hand, in a case where it is determined that the effective reception number is less than the effective reception upper limit number ("Yes" at Step S209), the control section 11 updates the effective reception number (more specifically, adding one to the effective reception number) (Step S210).

When the effective reception number is updated, the control section 11 determines whether the effective reception number after update reaches a necessary input number of times or not (Step S211). Here, in a case where it is determined that the effective reception number after update does not reach the necessary input number of times ("No" at Step S211), the control section 11 causes the processing flow to shift to the process at Step S204.

On the other hand, in a case where it is determined that the effective reception number after update reaches the necessary input number of times ("Yes" at Step S211) because the effective reception number after update is the same as the necessary input number of times, the control section 11 carries out the specific process indicated by the specific process information (Step S212), and causes the processing flow to shift to the process at Step S104 in the battle processing (see FIG. 6).

When the command reception number determining processing is terminated, the control section 11 determines whether a predetermined battle termination condition is satisfied or not (Step S104). Here, in a case where it is determined that the battle termination condition is not satisfied ("No" at Step S104), the control section 11 causes the processing flow to shift to the process at Step S102.

On the other hand, in a case where it is determined that the battle termination condition is satisfied ("Yes" at Step S104), for example, execution of the specific process causes the HP of the enemy character NPC to become zero, whereby the control section 11 carries out erase of the battle screen and the like, and terminates the processing herein.

As explained above, in the embodiment described above, the video game processing apparatus 100 for controlling progress of the video game by causing a display device (for example, the display section 13) to display the game screen on a display screen of the display device is configured so as to: receive a command inputted by means of an operation of the player A; measure a predetermined period of time defined in advance (for example, the time limit indicated by the specific process information) from a time when the time measuring start condition is satisfied in the video game; cause the display section 13 to display the measured time point notifying object 201, which indicates the measured time point corresponding to the measured time, on the display screen of the display section 13; determine whether the predetermined command (for example, the corresponding command indicated by the specific process information) is effectively received for the predetermined number of times or more (for example, the necessary input number of times indicated by the specific process information or more) when the predetermined period of time is measured; update the effective reception upper limit number by increasing the effective reception upper limit number from the initial number of times (for example, zero (0) times, see FIG. 4) to the predetermined number of times (for example, the necessary input number of times) in a stepwise manner in accordance with elapse of the measured time (for example, increase by four times per one second, see FIG. 4); carry out the specific process (for example, the process content indicated by the specific process information), which corresponds to the fact that the predetermined command is effectively received for the predetermined number of times, in a case where it is determined that the predetermined command is effectively received for the predetermined number of times or more; confirm whether the effective reception number, which indicates the number of times the predetermined command is effectively received, reaches the effective reception upper limit number or not when the predetermined command is received; and determine that the predetermined command is effectively received in a case where the effective reception number does not reach the effective reception upper limit number (for example, Step S209, see FIG. 8). Therefore, it becomes possible to improve interest of a player in the video game by allowing the player to carry out an input request of a command and determination of input completion so that the player can carry out an input operation readily while maintaining difficulty of an input operation of a command by the player.

Namely, since both the case where an inputted command is effectively received and the case where the inputted command is not effectively received are provided while notifying the player of the measured time by means of the measured time point notifying object, the player is caused to recognize that the input of the predetermined command is always requested by means of the measured time point notifying object on the display screen, but any command inputted more than the effective reception upper limit number according to the measured time is dealt with as an invalid command under internal processing. For that reason, by adjusting the specific process, it is possible to carry out an input request of a command and determination of input completion so that the player can readily carry out an input operation while maintaining difficulty of input completion of a command for the player.

Therefore, by configuring the video game processing apparatus 100 as described above, it is possible to provide the video game by which even a player unfamiliar with the command inputs can make a command input successful as well as a player familiar with the command input.

Further, in the embodiment described above, the video game processing apparatus 100 is configured so as to set up the effective reception upper limit number to the predetermined number of times when the measured time reaches the specific time (for example, the restriction canceling time indicated by the specific process information) before the predetermined period of time (for example, the time limit indicated by the specific process information) (that is, so as to cancel the restriction) (for example, see the restriction canceling rule in FIG. 2). Therefore, the player cannot recognize success or failure of the input until the specific time corresponding to the specific process elapses, and this makes it possible to avoid lowering of interest of the player in the video game that may occur because the player loses his or her concentration during display of the timer object.

Further, in the embodiment described above, the video game processing apparatus 100 is configured so as to increase the effective reception upper limit number every given time (for example, the divided time determined by the restriction canceling rule, see FIGS. 2 and 3) until the measured time measured by the timer reaches the specific time (for example, the restriction canceling time indicated by the specific process information). Therefore, it is possible to setup the video game so that even a player who can carry out a command input (for example, roll of the button) cannot cause the effective reception number to reach the necessary input number of times in a short time.

Further, in the embodiment described above, the video game processing apparatus 100 is configured so as to display a circular gauge (for example, the timer object 201) that has regions each corresponding to the divided time (for example, the areas E1 to E4) and indicates a remaining amount of the predetermined period of time. Therefore, it is possible to cause the player to recognize the elapsed time intuitively.

In this regard, although it has not been mentioned particularly in the embodiment described above, the video game processing apparatus 100 may be configured so as to: receive a command from each of a plurality of players; identify at least one player whom it is determined that a predetermined command (for example, the corresponding command indicated by the specific process information) is effectively received for the predetermined number of times or more (for example, the necessary input number of times indicated by the specific process information or more) than other players among the plurality of players; and carry out the specific process against a character operated by the identified player. By configuring the video game processing apparatus 100 in such a manner, it becomes possible to correct an imbalance of a command success rate between a player unfamiliar with the command inputs and a player familiar with the command inputs in a case where the two types of players carryout the video game together. Namely, in a case where the video game processing apparatus 100, which increases the effective reception upper limit number in a stepwise manner in accordance with elapse of time, is configured so as to target at a plurality of player characters, then the player who inputs the command for the necessary input number of times more rapidly than the other players after restriction of the effective reception number is cancelled establishes the command input. Therefore, it is thought that a possibility, which a player unfamiliar with the command inputs can terminate the command inputs of the predetermined number of times more rapidly than a player familiar with the command inputs, becomes higher compared with the case where the effective reception number is not restricted.

In this regard, in the embodiment described above, the video game processing apparatus 100 is configured so as to carry out various kinds of processing such as the video game processing described above on the basis of the video game program read out from the game cartridge 20. However, the video game processing apparatus 100 may be configured to acquire the video game program via a communication network such as the Internet. Further, the video game processing apparatus 100 may be configured to function as a video game server to provide the video game program to a video game terminal via the communication network.

Further, in the embodiment described above, the video game processing apparatus 100 carries out the various kinds of processes described above in accordance with various kind of control programs (for example, the video game processing program) stored in a storage device (the storage section 12) with which the video game processing apparatus 100 itself is provided.

<Second Embodiment>

Hereinafter, a second embodiment of the present invention will be described with reference to the appending drawings. In the second embodiment, the control section 11 carries out command reception number determining processing other than that in the first embodiment.

In this regard, explanation about the second embodiment described below proceeds with a focus on a portion different from the first embodiment described above. Therefore, the same reference numerals are assigned to the similar components to the first embodiment, and their explanation is omitted. In the second embodiment, the components with the same reference numerals as those in the first embodiment are the same as each other, unless they are not specifically explained. In this regard, the "components" mentioned herein include a processing operation of the video game processing apparatus. Therefore, explanation of the same processing as that in the first embodiment may be omitted.

Figure 10:
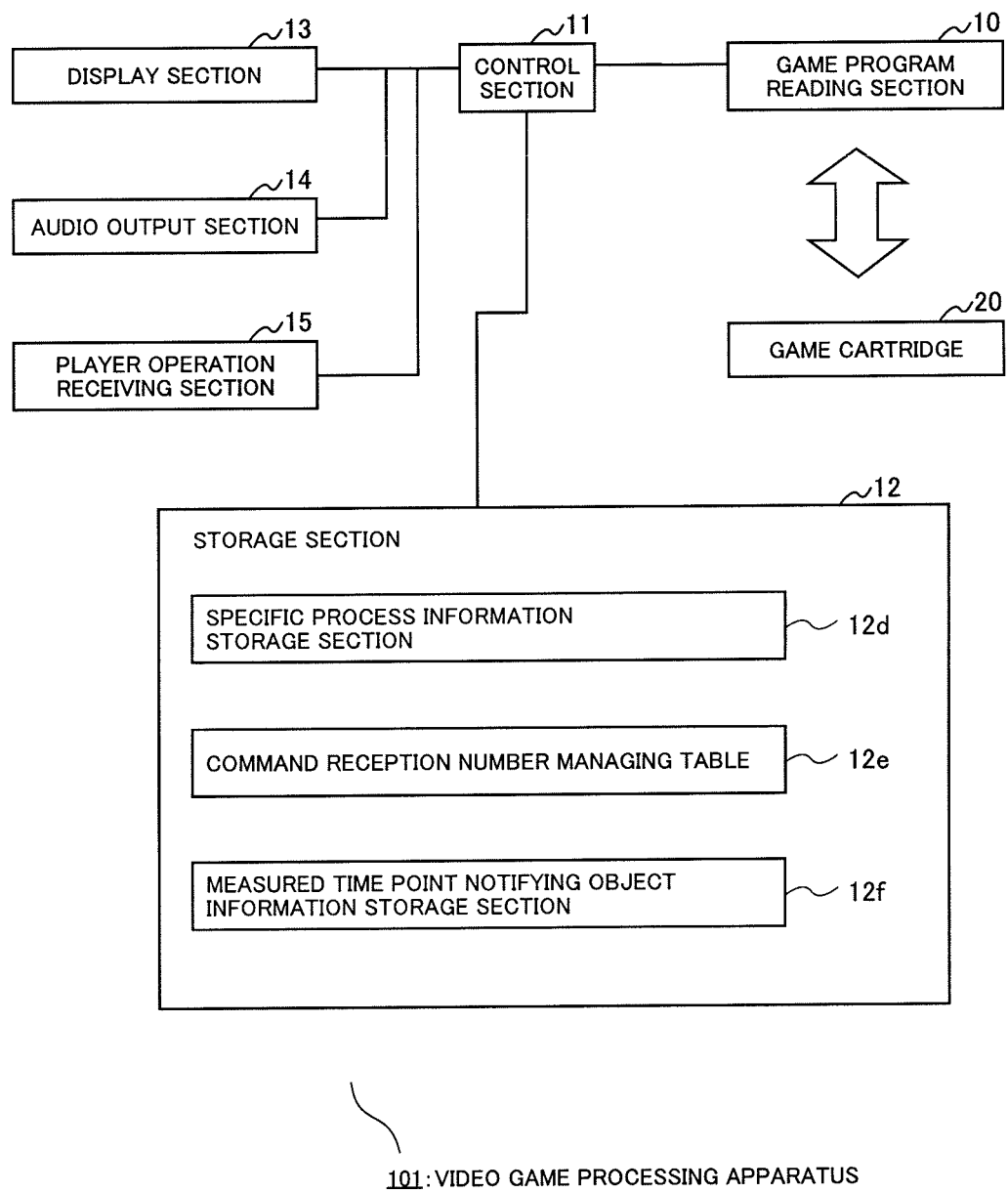
FIG. 10 is a block diagram showing a configuration example of a video game processing apparatus according to a second embodiment.

FIG. 10 is a block diagram showing a configuration example of a video game processing apparatus 101 according to the second embodiment of the present invention. As shown in FIG. 10, a storage section 12 of the video game processing apparatus 101 includes a specific process information storage section 12d, a command reception number managing table 12e, and a measured time point notifying object information storage section 12f.

The specific process information storage section 12d is a storage medium for storing specific process information. The specific process information is information on a specific process (hereinafter, referred to as a "specific process") carried out by the control section 11 in a case where an input of a predetermined command is received for the predetermined number of times via the player operation receiving section 15 in accordance with a progress status of the video game and the like.

FIG. 11 is an explanatory drawing showing an example of a storage state of the specific process information stored in the specific process information storage section 12d. As shown in FIG. 11, the specific process information contains: a name of a specific process; a time measuring start condition; a corresponding command; a necessary input number of times; an input time; a divided number; and process content. In this regard, in the present embodiment, the case where only one specific process carried out when an input of the predetermined command is received for the predetermined number of times within a predetermined period of time is stored will be described. However, the video game processing apparatus 100 may be configured so that information on plural kinds of specific processes is contained in the specific process information storage section 12d.

Here, the "time measuring start condition" means a condition that measurement of time for receiving a predetermined command corresponding to the specific process is start. In the present embodiment, the case where "start of hot competition (so-called Tsubazeriai) against an enemy character" is set up will be described as an example. In this regard, the content of the time measuring start condition is not particularly limited. For example, the time measuring may be configured to start when a predetermined operational input by the player is received.

Further, the "corresponding command" means the content of the command that the player is requested as an execution request of the specific process. In the present embodiment, the case where "press of an X button" is set up as the corresponding command corresponding to the specific process name "special attack" will be described as an example. In this regard, the corresponding command is not limited to press of a button that constitutes a controller. For example, the corresponding command may be combination of a plurality of commands or the like.

Further, the "necessary input number of times" means the input number of times of the corresponding command that the player is requested as the execution request of the specific process. Further, the "input time" means a time when an input of the corresponding command corresponding to the specific process is received. In the present embodiment, the case where the player is requested to input the corresponding command "press of the X button" for "eight times" within "four seconds" after the time measuring start condition is satisfied will be described as an example.

Further, the "divided number" means a number by which the necessary input number of times and the input time corresponding to the specific process are divided. In the present embodiment, the case where the necessary input number of times and the input time are divided into "four" will be described as an example. In this regard, hereinafter, the case where each of the necessary input number of times and the input time is divided equally will be described as an example. However, the necessary input number of times and the input time does not always have to be divided equally. For example, the video game processing apparatus 101 may be configured so that the necessary input number of times more than that in a first half is assigned to a second half of the input time, or the video game processing apparatus 101 may be configured in an opposite manner.

The command reception number managing table 12e is a storage medium for storing command reception number information on the number of times the command inputted by an operation of the player is received.

FIG. 12 is an explanatory drawing showing an example of a storage state of the command reception number information stored in the command reception number managing table 12e. As shown in FIG. 12, the command reception number information contains: an elapsed time (divided time) since measurement of time is started in accordance with satisfaction of the time measuring condition; the necessary input number of times (the number of times of division) of the corresponding command assigned every divided time; the number of times (command reception number) an input of a command is actually received; a determination result obtained by comparing the number of times of division with the command reception number.

FIGS. 13A to 13C are explanatory drawings for explaining a state of the command reception number managing table 12e in accordance with progress of the video game. As shown in FIGS. 13A to 13C, in the command reception number managing table 12e, the number of times the predetermined command inputted by means of an operation of the player is received is registered in a cell corresponding to the command reception number and the divided time. Then, in a case where the command reception number every divided time is the number of times of division assigned every divided time or more, "1" is registered to the determination result. Further, in a case where the command reception number every divided time is less than the number of times of division assigned every divided time, "0" is registered to the determination result. In this regard, the video game processing apparatus 101 may be configured so that, in a case where the determination result becomes "0" as shown in FIG. 13C, reception of the corresponding command is not carried out after that.

The measured time point notifying object information storage section 12f is a storage medium for storing information regarding a measured time point notifying object. The measured time point notifying object indicates a measured time point corresponding to a time (measured time) measured after satisfaction of the time measuring condition. In the present embodiment, by using the measured time point notifying object (hereinafter, referred to arbitrarily as "timer object"), the player is informed of input timing of the specific process.

Next, an operation of the video game processing apparatus 101 according to the present embodiment will be described.

Figure 14:
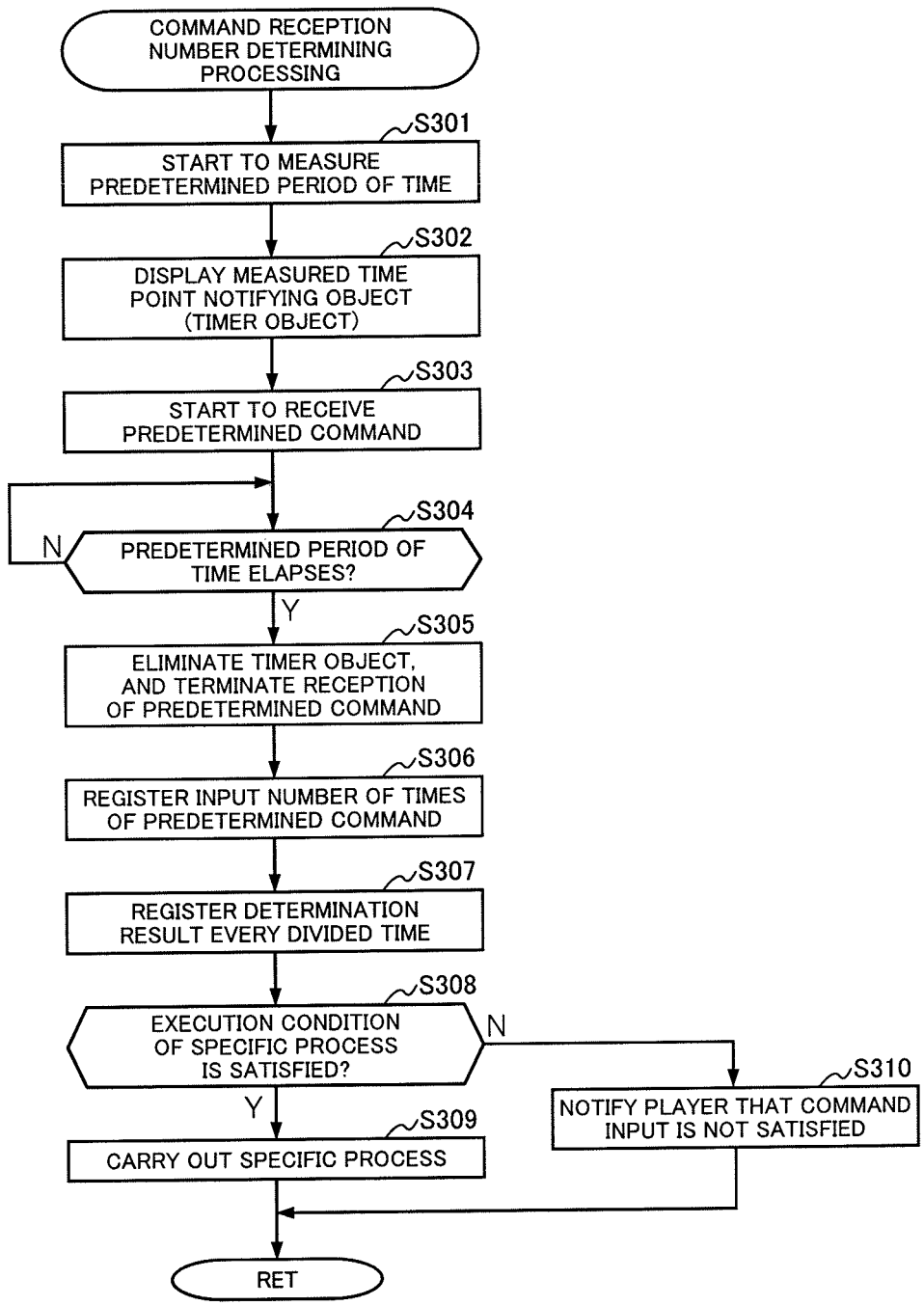
FIG. 14 is a flowchart showing an example of command reception number determining processing according to the second embodiment.

FIG. 14 is a flowchart showing an example of command reception number determining processing carried out by the video game processing apparatus 101. Namely, this is another example of the command reception number determining processing according to the first embodiment described above. When the processing flow is caused to shift from the battle processing (see FIG. 6) to a command reception number determining processing, the control section 11 first starts to measure a predetermined period of time (that is, an input time stored in the specific process information, four seconds) (Step S301).

When the measuring of the predetermined period of time is started, the control section 11 causes the display section 13 to display a measured time point notifying object (timer object) on a display screen of the display section 13 (Step S302).

At this time, the control section 11 causes the display section 13 to display the timer object 201 on the display screen. The timer object 201 is configured so that its gauge is fulfilled when the measured time (that is, four seconds, which is the input time) elapses.

When the timer object 201 is displayed (see FIG. 9), the control section 11 starts to receive a predetermined command (that is, a corresponding command indicated by specific process information, press of the X button.) (Step S303).

When the reception of the predetermined command is started, the control section 11 determines whether the predetermined period of time elapses or not (Step S304). Here, in a case where it is determined that the predetermined period of time does not elapse ("No" at Step S304), the control section 11 continues to receive the predetermined command.

On the other hand, in a case where it is determined that the predetermined period of time elapses ("Yes" at Step S304), the control section 11 eliminates the timer object 201 from the battle screen, and terminates the reception of the predetermined command (Step S305).

When the reception of the predetermined command is terminated, the control section 11 registers the number of times (that is, the input number of times of the predetermined command) the predetermined command inputted by an operation of the player A is received in the command reception number managing table 12e (Step S306). At this time, the control section 11 registers the number of times the predetermined command is received every divided time, for example, as shown in FIG. 13.

When the input number of times of the predetermined command is registered, the control section 11 carries out input determination every divided time, and registers a determination result in the command reception number managing table 12e (Step S307). Here, the control section 11 compares the number of times of division every divided time with the command reception number. In a case where the command reception number is the corresponding number of times of division (for example, in the case shown in FIG. 13, the number of times of division arranged on the same row) or more, the control section 11 registers "1" into the corresponding cell. On the other hand, in a case where the command reception number is less than the corresponding number of times of division, the control section 11 registers "0" into the corresponding cell.

When the determination result every divided time is registered, the control section 11 determines whether an execution condition of the specific process is satisfied or not (Step S308). Here, the control section 11 determines that the execution condition of the specific process is to be satisfied in a case where "1" is set to all of the determination results, as shown in FIG. 13A. Further, as shown in FIG. 13B, in a case where "0" is included in any determination result, the control section 11 determines that the execution condition of the specific process is not satisfied. In this regard, even in a case where the total of the command reception number is the necessary input number of times or more at this time, the control section 11 determines that the execution condition of the specific process is not satisfied.

In this regard, the execution condition of the specific process is not limited to this. For example, the video game processing apparatus 101 may be configured so that a rate of "1" and "0" indicated by the determination results is set up as the execution condition of the specific process (that is, even though a part of the command inputs is failed, the specific process may be carried out.). Further, the video game processing apparatus 101 may be configured so that the content of the specific process to be carried out is changed in accordance with the rate of "1" and "0" indicated by the determination results.

In the determination of whether the execution condition of the specific process is satisfied or not, in a case where it is determined that the execution condition of the specific process is satisfied ("Yes" at Step S308), the control section 11 carries out a specific process according to the satisfied execution condition (Step S309), and causes the processing flow to shift to the process at Step S104 in the battle processing (see FIG. 6).

On the other hand, in the determination of whether the execution condition of the specific process is satisfied or not, in a case where it is determined that the execution condition of the specific process is not satisfied ("No" at Step S308), the control section 11 notifies the player A that the input of the command corresponding to the specific process is not satisfied (i.e., failed) (Step S310), and causes the processing flow to shift to the process at Step S104 in the battle processing (see FIG. 6). In this regard, as a method of notifying the player A that the command input is not satisfied, various kinds of methods are thought, such that the effect is displayed on the battle screen, or the effect is notified by means of an audio output, for example.

As explained above, in the second embodiment described above, the video game processing apparatus 101 for controlling progress of the video game by causing a display device (for example, the display section 13) to display the game screen on a display screen of the display device is configured so as to: receive the command inputted by means of an operation of the player A; measure the predetermined period of time defined in advance (for example, the input time indicated by the specific process information) from the time when the time measuring start condition is satisfied in the video game (for example, when hot competition is started in a battle between two characters); cause the display device to display the measured time point notifying object (for example, the timer object 201), which indicates the measured time point corresponding to the measured time, on the display screen (for example, a predetermined position on the battle screen); determine whether an input of the predetermined command is received for the predetermined number of times or more (for example, the necessary input number of times indicated by the specific process information or more) when the predetermined period of time is measured; carry out the specific process, which corresponds to the fact that the input of the predetermined command is received for the predetermined number of times, in a case where it is determined that the input of the predetermined command is received for the predetermined number of times or more; and determine whether the input of the predetermined command is received for the number of times of division (for example, the number of times obtained by dividing eight times that is the necessary input number of times into four that is the divided number, that is, twice) obtained by dividing the predetermined number of times into the predetermined number or more every divided time obtained by dividing the predetermined period of time into a predetermined number (for example, four) (for example, every one second) when the command reception number is determined. Therefore, it becomes possible to improve interest of a player in the video game by allowing the player to carry out an input request of a command and determination of input completion so that the player can carry out an input operation readily while maintaining difficulty of an input operation of a command by the player.

Namely, since the input determination of the command is carried out every divided time while notifying the player of the measured time by means of the measured time point notifying object, the player is caused to recognize that the input of the predetermined command is always requested by means of the measured time point notifying object on the display screen, but under internal processing, even though the input of the command is received over the number of times of division within the divided time, the processing is dealt with as well as the case where the input of the command is received for only the number of times of division. For that reason, by adjusting the divided time and the number of times of division, it becomes possible to carry out an input request of a command and determination of input completion so that the player can readily carry out an input operation while maintaining difficulty of input completion of a command for the player.

Therefore, by configuring the video game processing apparatus 101 as described above, it is possible to provide the video game by which even a player unfamiliar with the command inputs can make a command input successful as well as a player familiar with the command inputs.

Further, in the second embodiment described above, the video game processing apparatus 101 is configured so as to determine whether the input of the predetermined command is received for the predetermined number of times or more or not when the measurement of the predetermined period of time is terminated (for example, when the predetermined period of time elapses from the time when the measurement of the predetermined period of time is started) (for example, see the process at Step S308 in FIG. 14). Therefore, the player cannot recognize success or failure of the input until the predetermined period of time (input time) corresponding to the specific process elapses, and this makes it possible to avoid lowering of interest of the player in the video game that may occur because the player loses his or her concentration during display of the timer object.

In this regard, in the second embodiment described above, the case where the video game processing apparatus 101 carries out the input determination of the predetermined command when measurement of the predetermined period of time is terminated has been explained. However, timing of the input determination of the predetermined command is not limited to this. For example, the video game processing apparatus 101 may be configured so as to determine, whenever the divided time elapses, whether the input of the predetermined command is received for the number of times of division, which is associated with the elapsed divided time, or more. Further, in this case, the video game processing apparatus 101 may be configured so as to terminate measuring of the predetermined period of time in a case where it is determined that the input of the predetermined command is not received for the number of times of division, which is associated with the elapsed divided time, or more. In this case, the update of the command reception number managing table 12e is terminated at a state shown in FIG. 13C, for example. By configuring the video game processing apparatus 101 in this manner, it becomes possible to determine success or failure of a command input every divided time, and this makes it possible to avoid continuation of the time measuring after unsatisfaction of the command input is established.

In this regard, although it has not been mentioned particularly in the second embodiment described above, the video game processing apparatus 101 may be configured so as to: receive the command from each of the plurality of players; identify at least one player from whom it is determined that the input of the predetermined command is received for the predetermined number of times more rapidly than the other players of the plurality of player; and carry out the specific process associated with the identified player in advance. By configuring the video game processing apparatus 101 in such a manner, it becomes possible to correct an imbalance of a command success rate between a player unfamiliar with the command inputs and a player familiar with the command inputs in a case where the two types of players carry out the video game together. Namely, in a case where the video game processing apparatus 101, which determines whether an input of a predetermined command is received by the number of times of division every divided time, is configured as described above, then even the case where each player carries out the command input for the number of times more than the number of times of division at dividing timing does not affect the command success rate, a player who inputs the command for the number of times of division more quickly than the other players at the final divided time (that is, the farthermost divided time from start of time measuring) establishes the command input. Therefore, it is thought that a possibility, which a player unfamiliar with the command inputs can terminate the command inputs of the predetermined number of times more rapidly than a player familiar with the command inputs, becomes higher compared with the case where the input time is not divided.

In this regard, in the second embodiment described above, the video game processing apparatus 101 carries out the various kinds of processes described above in accordance with various kind of control programs (for example, the video game processing program) stored in a storage device (the storage section 12) with which the video game processing apparatus 100 itself is provided.

Industrial Applicability

The present invention is useful to provide a video game processing apparatus by which it becomes possible to improve interest of a player in the video game by allowing the player to carry out an input request of a command and determination of input completion so that the player can carry out an input operation readily while maintaining difficulty of an input operation of a command by the player.

What is claimed is:

1. A video game processing apparatus for controlling progress of a video game by causing a display device to display a game screen on a display screen of the display device, the video game processing apparatus comprising:
   a command receiver for receiving a command inputted by means of an operation of a player;
   a timer for measuring a predetermined period of time defined in advance from a time when a time measuring start condition is satisfied in the video game;
   an object display controller for causing the display device to display a measured time point notifying object on the display screen, the measured time point notifying object indicating a measured time point corresponding to a measured time measured by the timer;
   a command reception number determiner for determining whether the command receiver effectively receives a predetermined command for a predetermined number of times or more or not when the timer measures the predetermined period of time;
   an effective reception upper limit number updater for updating an effective reception upper limit number by increasing the effective reception upper limit number from an initial number of times to the predetermined number of times in a stepwise manner in accordance with elapse of the measured time measured by the timer; and
   a specific process executor for carrying out a specific process in a case where the command reception number determiner determines that the predetermined command is effectively received for the predetermined number of times, the specific process corresponding to the predetermined command being effectively received for the predetermined number of times,
   wherein the command reception number determiner confirms whether an effective reception number, which indicates the predetermined number of times the predetermined command is effectively received, reaches the effective reception upper limit number or more when the command receiver receives the predetermined command, and determines that the predetermined command is effectively received by the command receiver in a case where the effective reception number does not reach the effective reception upper limit number.

2. The video game processing apparatus according to claim 1, wherein the effective reception upper limit number updater sets up the effective reception upper limit number to the predetermined number of times when the measured time measured by the timer reaches a specific time before the predetermined period of time.

3. The video game processing apparatus according to claim 2, wherein the effective reception upper limit number updater increases the effective reception upper limit number every given time until the measured time measured by the timer reaches the specific time.

4. The video game processing apparatus according to claim 1, wherein the measured time point notifying object has a region according to the elapse of the measured time, and is a circular gauge indicating a remaining amount of the predetermined period of time.

5. The video game processing apparatus according to claim 1, wherein the command receiver receives a command from each of a plurality of players,
   wherein the specific process executor has a player identifier for identifying at least one player, and the command reception number determiner determines that the predetermined command is effectively received for the predetermined number of times or more from the at least one player more rapidly than the other players of the plurality of players, and
   wherein the specific process executor carries out the specific process against a character operated by the player identified by the player identifier.

6. A non-transitory computer readable medium including a video game processing program product for causing a video game processing apparatus to control an operation of the video game processing apparatus, the video game processing apparatus controlling progress of a video game by displaying a game screen on a display screen of a display device, the video game processing program product causing the video game processing apparatus to execute:
   receiving a command inputted by means of an operation of a player;
   measuring a predetermined period of time defined in advance from a time when a time measuring start condition is satisfied in the video game;
   causing the display device to display a measured time point notifying object on the display screen, the measured time point notifying object indicating a measured time point corresponding to a measured time measured in the measuring of the predetermined period of time;
   determining whether a predetermined command is effectively received for a predetermined number of times or more in the receiving a command or not when the predetermined period of time is measured in the measuring of the predetermined period of time;
   updating an effective reception upper limit number by increasing the effective reception upper limit number from an initial number of times to the predetermined number of times in a stepwise manner in accordance with elapse of the measured time measured in the measuring of the predetermined period of time; and carrying out a specific process in a case where it is determined, in the determining whether the predetermined command is effectively received, that the predetermined command is effectively received for the predetermined number of times, the specific process corresponding to the predetermined command being effectively received for the predetermined number of times, wherein, in the determining whether the predetermined command is effectively received, it is confirmed whether an effective reception number, which indicates the predetermined number of times the predetermined command is effectively received, reaches the effective reception upper limit number or more when the predetermined command is received in the receiving the command, and it is determined that the predetermined command is effectively received in the receiving the command in a case where the effective reception number does not reach the effective reception upper limit number.

\* \* \* \* \*